US012756937B2

(12) United States Patent
Xu

(10) Patent No.: US 12,756,937 B2
(45) Date of Patent: Oct. 6, 2026

(54) PHOTOGRAPHING BASED ON A TARGET EXPOSURE PARAMETER

(71) Applicant: HONOR DEVICE CO., LTD., Shenzhen (CN)

(72) Inventor: Jirun Xu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 134 days.

(21) Appl. No.: 18/837,797

(22) PCT Filed: Jun. 6, 2023

(86) PCT No.: PCT/CN2023/098632
§ 371 (c)(1),
(2) Date: Aug. 12, 2024

(87) PCT Pub. No.: WO2024/027331
PCT Pub. Date: Feb. 8, 2024

(65) Prior Publication Data
US 2025/0150717 A1 May 8, 2025

(30) Foreign Application Priority Data
Aug. 5, 2022 (CN) ......................... 202210940028.8

(51) Int. Cl.
*H04N 23/73* (2023.01)
*H04N 23/63* (2023.01)
(Continued)

(52) U.S. Cl.
CPC ........... *H04N 23/73* (2023.01); *H04N 23/632* (2023.01); *H04N 23/71* (2023.01); *H04N 23/741* (2023.01); *H04N 23/743* (2023.01); *H04N 23/80* (2023.01)

(58) Field of Classification Search
CPC ...... H04N 23/73; H04N 23/743; H04N 23/61; H04N 23/80; H04N 23/741; H04N 23/71; H04N 23/632
See application file for complete search history.

(56) References Cited

U.S. PATENT DOCUMENTS 5,049,916 A 9/1991 O'Such et al.
11,070,743 B2 7/2021 Sun et al.
(Continued)

FOREIGN PATENT DOCUMENTS

AU 2018415738 A1 9/2020
CN 107580184 A 1/2018
(Continued)

*Primary Examiner* — Kelly L Jerabek
(74) *Attorney, Agent, or Firm* — Fish & Richardson P.C.

(57) ABSTRACT

This application provides a photographing method and a related apparatus, and relates to the field of terminal technologies. The method includes: displaying a first image in a photographing interface, where the first image is a preview image captured for a first scene; determining, in response to a photographing operation of a user, whether the first scene is the same as a scene in previous photographing; and when the first scene is the same as the scene in previous photographing, determining, as a target exposure parameter, an exposure parameter used for previous photographing; and photographing the first scene based on the target exposure parameter. According to the method provided in this application, consistency between photographing results can be maintained, and photographing experience of a user is improved.

19 Claims, 4 Drawing Sheets

(51) Int. Cl.

| | |
|---|---|
| ***H04N 23/71*** | (2023.01) |
| ***H04N 23/741*** | (2023.01) |
| ***H04N 23/743*** | (2023.01) |
| ***H04N 23/80*** | (2023.01) |

(56) References Cited

U.S. PATENT DOCUMENTS

| | | | | |
|---|---|---|---|---|
| 2013/0076927 | A1 | 3/2013 | Lee | |
| 2018/0124317 | A1 | 5/2018 | Liu et al. | |
| 2021/0136297 | A1* | 5/2021 | Park | H04N 9/8205 |
| 2021/0360157 | A1* | 11/2021 | Veit | H04N 23/667 |
| 2022/0053143 | A1* | 2/2022 | Liu | H04N 23/633 |
| 2022/0247929 | A1 | 8/2022 | Yang et al. | |

FOREIGN PATENT DOCUMENTS

| | | | |
|---|---|---|---|
| CN | 109831628 | A | 5/2019 |
| CN | 109996009 | A | 7/2019 |
| CN | 110445988 | A | 11/2019 |
| CN | 111316635 | A | 6/2020 |
| CN | 116095513 | A | 5/2023 |
| JP | H0990460 | A | 4/1997 |
| WO | 2022083325 | A1 | 4/2022 |

* cited by examiner

PHOTOGRAPHING BASED ON A TARGET EXPOSURE PARAMETER

CROSS-REFERENCE TO RELATED APPLICATIONS

This application is a national stage of International Application No. PCT/CN2023/098632, filed on Jun. 6, 2023, which claims priority to Chinese Patent Application No. 202210940028.8, filed on Aug. 5, 2022. The aforementioned applications are hereby incorporated by reference in their entireties.

TECHNICAL FIELD

This application relates to the field of terminal technologies, and in particular, to a photographing method and a related apparatus.

BACKGROUND

"Photographing consistency" is a strong demand of a user, and specifically means that results of a plurality of times of photographing should be consistent in a same scene. However, currently, photographing consistency of an electronic device with a photographing function is not good, that is, when the user photographs a same scene a plurality of times by using the electronic device with a photographing function, there is a difference between results of the plurality of times of photographing. Consequently, photographing experience of the user is degraded.

Therefore, a method that can be used to maintain photographing consistency is urgently required, so as to improve photographing experience of the user.

SUMMARY

This application provides a photographing method and a related apparatus, so that consistency between photographing results can be maintained, and photographing experience of a user is improved.

According to a first aspect, a photographing method is provided, and is applied to an electronic device configured with a camera, where the method includes: displaying a first image in a photographing interface, where the first image is a preview image captured for a first scene; determining, in response to a photographing operation of a user, whether the first scene is the same as a scene in previous photographing; and when the first scene is the same as the scene in previous photographing, determining, as a target exposure parameter, an exposure parameter used for previous photographing; and photographing the first scene based on the target exposure parameter.

In this application, when responding to the photographing operation of the user, the electronic device may determine whether the first scene in current photographing is the same as the scene in previous photographing. Therefore, when the scenes in the two times of photographing are the same, the exposure parameter used for previous photographing may be still used as an exposure parameter (target exposure parameter) used for current photographing, so that photographing is performed based on the exposure parameter. In this way, a same scene is photographed by using a same exposure parameter, and consistency between a plurality of times of photographing on a same scene can be well maintained.

With reference to the first aspect, in some implementations of the first aspect, the method further includes: determining, when the first scene is different from the scene in previous photographing, whether luminance of the first image meets a preset condition; and when the luminance of the first image meets the preset condition, determining, as the target exposure parameter, an exposure parameter used to generate the first image; or when the luminance of the first image does not meet the preset condition, adjusting an exposure parameter until luminance of a second image displayed by using the photographing interface meets the preset condition, and determining, as the target exposure parameter, an exposure parameter used to generate the second image, where the second image is another preview image captured for the first scene, the exposure parameter used to generate the first image is different from the exposure parameter used to generate the second image, the preset condition is that a difference between target luminance and current luminance is less than or equal to a first preset threshold, the target luminance is actual luminance of the first scene, and the current luminance is luminance of a currently captured preview image.

Based on this, that the first scene is different from the scene in previous photographing means that the scene in current photographing is a new scene. In this case, it may be further determined whether the preview image corresponding to the first scene meets the preset condition. When the preset condition is met, the exposure parameter may not be adjusted, and the exposure parameter used to generate the current preview image is used as the target exposure parameter used to photograph the first scene. According to this method for determining the target exposure parameter, it may be ensured that preview images obtained for a same scene a plurality of times are consistent.

With reference to the first aspect, in some implementations of the first aspect, the determining, in response to a photographing operation of a user, whether the first scene is the same as a scene in previous photographing includes: setting a value of a preset flag bit to a first value in response to the photographing operation of the user, where the first value is used to indicate the electronic device to perform photographing; and determining, based on the first value, whether the first scene is the same as the scene in previous photographing.

The value of the preset flag bit is set to the first value, so that the electronic device enters a photographing mode. The electronic device that enters the photographing mode may determine whether the first scene in the currently captured preview image is the same as the scene in previous photographing, so that the exposure parameter used for previous photographing is used when the first scene is the same as the scene in previous photographing.

With reference to the first aspect, in some implementations of the first aspect, the determining, when the first scene is different from the scene in previous photographing, whether luminance of the first image meets a preset condition includes: setting the value of the preset flag bit to a second value when the first scene is different from the scene in previous photographing; and determining, based on the second value, whether the luminance of the first image meets the preset condition.

The value of the preset flag bit is set to the second value, so that the electronic device enters a preview mode. The electronic device that enters the preview mode may determine, based on the luminance of the first image captured in the preview mode, whether the exposure parameter used to generate the first image needs to be adjusted. After adjustment of the exposure parameter is completed, that is, after the target exposure parameter is determined, the value of the preset flag bit may be set to the first value again, so that the electronic device enters the photographing mode again.

It should be understood that, when the value of the preset flag bit is set to the second value, it indicates that the electronic device enters the preview mode.

With reference to the first aspect, in some implementations of the first aspect, the determining whether the first scene is the same as a scene in previous photographing includes: calculating a similarity between the first image and a third image captured during the previous photographing; and when the similarity is less than or equal to a second preset threshold, determining that the first scene is the same as the scene in previous photographing.

With reference to the first aspect, in some implementations of the first aspect, the calculating a similarity between the first image and a third image obtained during the previous photographing includes: obtaining a first histogram corresponding to the first image, where the first histogram represents an association relationship between a quantity of pixels of the first image and a gray level; obtaining a second histogram corresponding to the third image, where the second histogram represents an association relationship between a quantity of pixels in the third image and a gray level; and calculating a similarity diff between the first histogram and the second histogram by using the following formula:

$$diff = \sum_{k=0}^{n} \frac{(H1(k) - H2(k))^2}{H1(k) + H2(k)},$$

H1(k) is a quantity of pixels corresponding to a gray level kin the first histogram, H2(k) is a quantity of pixels corresponding to a gray level k in the second histogram, and n=255.

With reference to the first aspect, in some implementations of the first aspect, it is determined, in response to the photographing operation of the user, whether a dynamic range DR parameter of a first preview image reaches a preset threshold, where the first preview image is a preview image displayed in the photographing interface when the electronic device receives the photographing operation of the user; when the DR parameter reaches the preset threshold, a photographed raw image is separately processed in a first processing manner and a second processing manner, to separately obtain a fourth image and a fifth image, where YUV of the fourth image is different from YUV of the fifth image, and the first preview image and the raw image are images captured for a same scene; fusion processing is performed on the fourth image and the fifth image to obtain a target image; and the target image is displayed.

The first processing manner may be understood as a process of processing the obtained raw image when the DR parameter of the preview image is less than the preset threshold and the electronic device responds to the photographing operation of the user. The second processing manner may be understood as a process of processing the obtained raw image when the DR parameter of the preview image is greater than the preset threshold and the electronic device responds to the photographing operation of the user. Because the two processing manners are different, there is a difference between final photographing results of a same scene. Because the DR parameter of the preview image dynamically changes, when the DR parameter is at the preset critical threshold, different processing modes are entered in different times of photographing, and consequently consistency between final photographing results cannot be maintained. In this application, when the DR parameter reaches the preset threshold, the foregoing two processing manners are separately used to process the image, so that the final target image is obtained in a fusion processing manner. In this manner, results of a plurality of times of photographing may be the sane when the DR parameter of the preview image reaches the preset threshold.

It should be understood that, because the DR parameter is determined based on the preview image, and there is also a difference between preview images of a same scene, DR parameters corresponding to a same scene also dynamically change. In other words, for different times of photographing of a same scene, obtained DR parameters are not necessarily the same. Therefore, reaching the preset threshold in this application may be understood as being near the preset threshold or equal to the preset threshold. For example, the preset threshold is set to 0.5. If the determined DR parameter is between 0.45 and 0.55, it is considered that the preset threshold is reached.

With reference to the first aspect, in some implementations of the first aspect, the first processing manner and the second processing manner are used to perform tone mapping on the raw image, but the second processing manner includes post-processing, and the first processing manner does not include post-processing.

A person skilled in the art may understand that image signal processing on the raw image includes but is not limited to tone mapping, and a processing procedure of the raw image is not limited in this specification. Herein, a tone mapping procedure is separately described only for ease of distinguishing between the first processing manner and the second processing manner.

In this application, when the first processing manner is used to perform tone mapping on the raw image, post-processing is not performed. When the second processing manner is used to perform tone mapping on the raw image, post-processing is performed. Two images with different YUV may be obtained by separately processing a same raw image in the first processing manner and the second processing manner. It should be understood that, for a specific process of tone mapping, post-processing, an d the like, refer to the existing technology, and details are not described herein.

With reference to the first aspect, in some implementations of the first aspect, the performing fusion processing on the fourth image and the fifth image based on the DR parameter to obtain a target image includes: weighting a pixel value of the fourth image and a pixel value of the fifth image by using the DR parameter as a weight of the fourth image and a difference between 1 and the DR parameter as a weight of the fifth image, to obtain the target image.

According to a second aspect, this application provides an electronic device, including a processor and a memory, where the processor is coupled to the memory, and may be configured to execute instructions in the memory, to implement the method according to any possible implementation of any of the foregoing aspects.

Optionally, the electronic device further includes a communication interface, and the processor is coupled to the communication interface.

According to a third aspect, this application provides a processor, including an input circuit, an output circuit, and a processing circuit. The processing circuit is configured to: receive a signal by using the input circuit, and transmit a signal by using the output circuit, to enable the processor to perform the method according to any possible implementation of any of the foregoing aspects.

In a specific implementation process, the processor may be a chip, the input circuit may be an input pin, the output circuit may be an output pin, and the processing circuit may be a transistor, a gate circuit, a flip-flop, various logic circuits, and the like. The input signal received by the input circuit may be received and input by, for example, but not limited to, a receiver. The signal output by the output circuit may be output to and transmitted by, for example, but not limited to, a transmitter. In addition, the input circuit and the output circuit may be a same circuit, and the circuit separately serves as the input circuit and the output circuit at different moments. Specific implementations of the processor and various circuits are not limited in this application.

According to a fourth aspect, this application provides a processing apparatus, including a processor and a memory. The processor is configured to read instructions stored in the memory, and can receive a signal by using a receiver and transmit a signal by using a transmitter, to perform the method according to any possible implementation of any of the foregoing aspects.

Optionally, there are one or more processors, and there are one or more memories.

Optionally, the memory and the processor may be integrated, or the memory and the processor are separately disposed.

In a specific implementation process, the memory may be a non-transitory (non-transitory) memory such as a read-only memory (read-only memory, ROM). The memory and the processor may be integrated into a same chip, or may be separately disposed on different chips. A type of the memory and disposition manners of the memory and the processor are not limited in this application.

It should be understood that a related data exchange process, for example, sending of indication information, may be a process of outputting the indication information from the processor, and receiving of capability information may be a process of receiving input capability information by the processor. Specifically, data output by the processor may be output to the transmitter, and input data received by the processor may be from the receiver. The transmitter and the receiver may be collectively referred to as a transceiver.

The processing apparatus in the fourth aspect may be a chip, and the processor may be implemented by using hardware or software. When being implemented by using hardware, the processor may be a logic circuit, an integrated circuit, or the like. When being implemented by using software, the processor may be a general-purpose processor, and is implemented by reading software code stored in the memory. The memory may be integrated into the processor, or may be located outside the processor and exist independently.

According to a fifth aspect, this application provides a computer-readable storage medium, where the computer-readable storage medium stores a computer program (which may also be referred to as code or an instruction), and when the computer program is run on a computer, the computer is enabled to perform the method according to any possible implementation of the foregoing first aspect.

According to a sixth aspect, this application provides a computer program product, where the computer program product includes a computer program (which may also be referred to as code or an instruction), and when the computer program is run, a computer is enabled to perform the method according to any possible implementation of the foregoing first aspect.

DESCRIPTION OF EMBODIMENTS

The following describes the technical solutions in this application with reference to the accompanying drawings.

Figure 1:
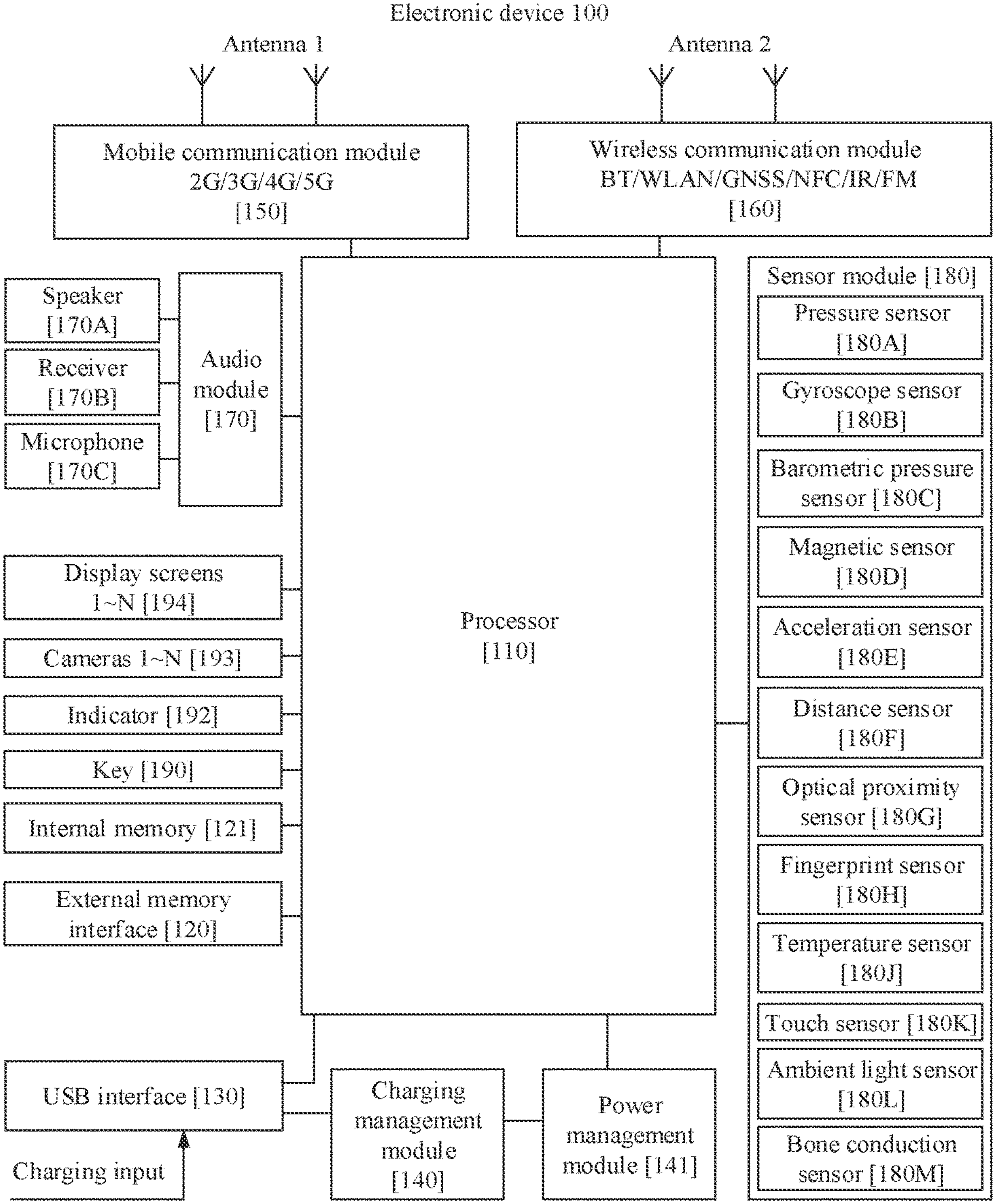
FIG. 1 is a schematic diagram of a structure of an electronic device according to an embodiment of this application.

FIG. 1 is a schematic diagram of a structure of an electronic device according to an embodiment of this application. As shown in FIG. 1, an electronic device 100 may include a processor 110, an extremal memory interface 120, an internal memory 121, a universal serial bus (universal serial bus, USB) interface 130, a charging management module 140, a power management module 141, an antenna 1, an antenna 2, a mobile communication module 150, a wireless communication module 160, an audio module 170, a speaker 170A, a receiver 170B, a microphone 170C, a sensor module 180, a key 190, an indicator 192, a camera 193, a display screen 194, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of this application does not constitute a specific limitation on the electronic device. In some other embodiments of this application, the electronic device may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between modules illustrated in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The electronic device 100 implements a display function by using a graphics processing unit (graphics processing unit, G PUT), the display screen 194, an application processor, and the like. The GPU is connected to the display screen 194 and the application processor The GPU is configured to perform mathematical and geometric calculation for graphics rendering. The processor 110 may include one or more GPUs that execute program instructions to generate or change displayed information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), a low temperature polycrystalline oxide (low temperature polycrystalline oxide, LTPO), or the like. In some embodiments, the electronic device may include one or N display screens 194, where N is a positive integer greater than 1.

The electronic device may implement a photographing function by using the image signal processor (image signal processing, ISP), the camera 193, the video codec, the GPU, the display screen 194, the application processor, and the like. The camera 193 is configured to capture a still image or a video. In some embodiments, the electronic device may include one or N cameras 193, where N is a positive integer greater than 1. For example, a first image and a second image in this application may be images captured by the camera 193, and a photographing interface in this application may be an interface displayed on the foregoing display screen 194.

The external memory interface 120 may be configured to connect to an external memory card, to expand a storage capability of the electronic device. The external memory card communicates with the processor 110 by using the external memory interface 120, to implement a data storage function, for example, to store files such as music, a video, and a picture in the external memory card. The internal memory 121 may be configured to store computer-executable program code, and the executable program code includes instructions. The internal memory 121 may include a program storage area and a data storage area.

The electronic device in this embodiment of this application may also be referred to as a terminal device, a client, user equipment (user equipment, UE), a mobile station (mobile station, MS), a mobile terminal (mobile terminal, MT), an access terminal, a subscriber unit, a subscriber station, a mobile station, a mobile console, a remote station, a remote terminal, a mobile device, a wireless communication device, a user agent, a user apparatus, or the like.

Currently, some examples of the electronic device include a mobile phone (mobile phone), a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal device in a 5G network, a terminal device in a future evolved public land mobile network (public land mobile network, PLMN), and the like. This is not limited in this application.

It should be understood that the electronic device in this embodiment of this application may be any electronic device with a photographing function.

Generally, when a user photographs a same scene a plurality of times by using an electronic device with a photographing function, there is usually a difference between a plurality of obtained photographing results. In other words, the results obtained after the user photographs the same scene a plurality of times lack consistency. This degrades photographing experience of the user.

Currently, a reason for poor photographing consistency in a photographing process may include the following several aspects:

1. Specific tolerance (tolerance) exists in determining convergence of automatic exposure (automatic exposure, AE). Currently, to avoid luminance oscillation of AE, a convergence determining condition of AE is as follows:

$$|\text{target luminance} - \text{current luminance}| \leq \text{tolerance}.$$

For example, preset tolerance is 2. When the target luminance is 50, and the current luminance is 48 and 52, it is determined, based on the convergence determining condition, that AE is converged. However, a luminance difference of a raw (raw) image is 4. After processing by an image signal processing (image signal processing, ISP) module, a finally obtained image difference is larger, so that the human eye can see an obvious difference.

2. Entering different photographing modes causes a large difference. A reason is that different photographing modes correspond to different processing manners. In some critical scenarios, different times of photographing may be determined as different photographing modes, and there is a large difference between finally obtained photographing results.

In view of this, the embodiments of this application provide a photographing method and a related apparatus. A first image captured for a first scene is displayed in a photographing interface. In this case, the electronic device further determines, in response to a photographing operation of a user, whether the current photographing scene is the same as a scene in previous photographing. When the scenes in the two times of photographing are the same, an exposure parameter used for previous photographing is still used for current photographing, that is, a same exposure parameter is used to photograph a same scene. In this processing manner, consistency between a plurality of times of photographing on a same scene can be well maintained, and photographing experience of a user is improved.

To clearly describe technical solutions in embodiments of this application, in the embodiments of this application, words such as "first" and "second" are used to distinguish between same items or similar items with basically the same functions and effects. For example, a first image and a second image are merely used to distinguish between different images, and are not intended to limit a sequence thereof. A person skilled in the art may understand that the words such as "first" and "second" do not limit a quantity and an execution sequence, and the words such as "first" and "second" do not indicate a definite difference.

It should be noted that in this application, the word such as "example" or "for example" is used to represent giving an example, an illustration, or a description. Any embodiment or design solution described as an "example" or "for example" in this application should not be explained as being more preferred or having more advantages than other embodiments or design solutions. Exactly, the words such as "example" or "for example" are used to present related concepts in a specific manner.

In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following items" or a similar expression thereof means any combination of these items, including a single item or any combination of a plurality of items. For example, at least one of a, b, or c may represent a, b, c, a and b, a and c, b and c, or a, b, and c, where a, b, and c may be singular or plural.

The following describes in detail, by using specific embodiments, the technical solutions of this application and how to resolve the foregoing technical problem in the technical solutions of this application. The following several specific embodiments may be implemented independently, or may be combined with each other. For same or similar concepts or processes, details may not be described in some embodiments.

It should be understood that the photographing method shown below may be performed by an electronic device with a photographing function. This is not limited in this application. The following describes in detail, by using the electronic device with a photographing function (which is briefly referred to as an electronic device below for ease of description) as an example, the technical solutions provided in the embodiments of this application.

Figure 2:
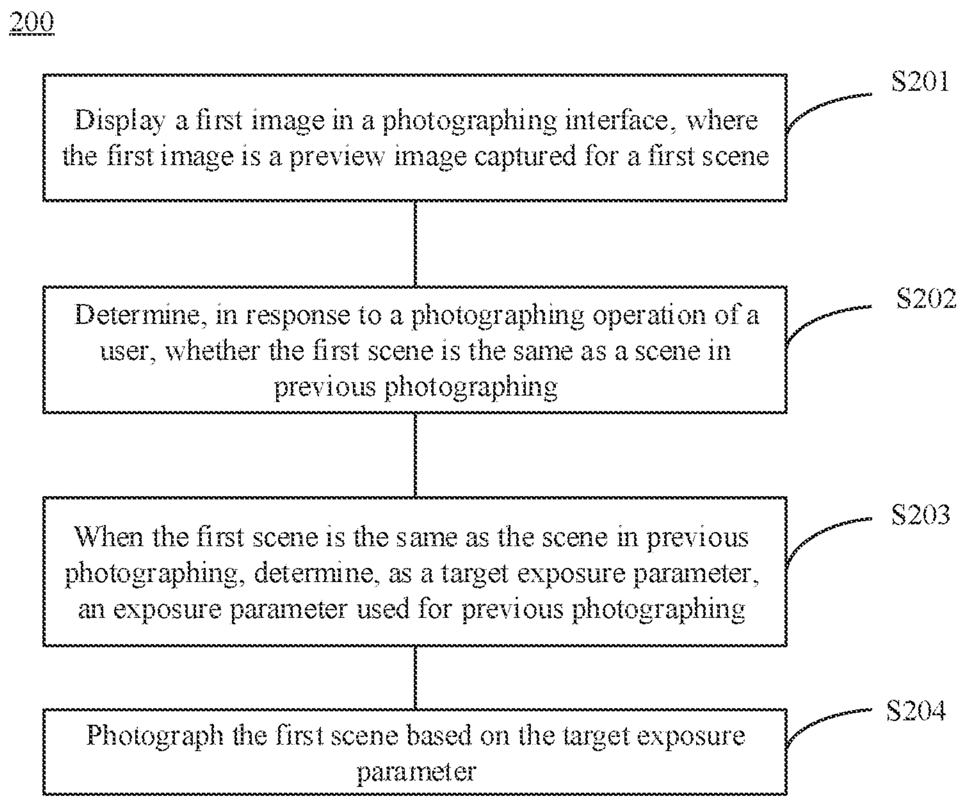
FIG. 2 is a schematic flowchart of a photographing method according to an embodiment of this application.

FIG. 2 is a schematic flowchart of a photographing method 200 according to an embodiment of this application. As shown in FIG. 2, the method 200 may include S201 to S204. Specific steps are described in detail below:

S201. Display a first image in a photographing interface, where the first image is a preview image captured for a first scene.

The first scene may be any to-be-photographed scene, such as a person, the sky, the ground, or another scene.

It should be understood that the foregoing first image may be displayed on a display screen of the electronic device. The foregoing first image may be an image captured by the electronic device for the first scene by using a camera.

S202. Determine, in response to a photographing operation of a user, whether the first scene is the same as a scene in previous photographing.

It should be understood that the photographing operation of the user may be an operation of tapping a photographing shutter on the electronic device by the user, or another operation that is preset on the electronic device and that is used for photographing by the user, for example, photographing is performed when the user says "take a photo", "cheese", or another command. Alternatively, when a to-be-photographed object is a user, photographing is performed when the user gestures OK toward the camera or photographing is performed when the user smiles at the camera. A specific photographing operation is not limited in this application.

S203. When the first scene is the same as the scene in previous photographing, determine, as a target exposure parameter, an exposure parameter used for previous photographing.

It should be understood that the electronic device may record an exposure parameter that corresponds to a raw image of the first scene and that is obtained in each time of photographing. The raw image may be understood as a preview image that is of the first scene and that is displayed in the photographing interface when the electronic device receives the photographing operation of the user.

S204. Photograph the first scene based on the target exposure parameter.

In this embodiment of this application, when the electronic device responds to the photographing operation of the user, it may be determined whether the first scene in current photographing is the same as the scene in previous photographing. Therefore, when the scenes in the two times of photographing are the same, the exposure parameter used for previous photographing may be still used as an exposure parameter (target exposure parameter) used for current photographing, so that photographing is performed based on the exposure parameter. In this way, a same scene is photographed by using a same exposure parameter, and consistency between a plurality of times of photographing on a same scene can be well maintained, that is, results of a plurality of times of photographing on a same scene are the same, thereby effectively improving photographing experience of the user.

In an optional embodiment, the foregoing method 200 further includes: determining, when the first scene is different from the scene in previous photographing, whether luminance of the first image meets a preset condition; and when the luminance of the first image meets the preset condition, determining, as the target exposure parameter, an exposure parameter used to generate the first image; or; when the luminance of the first image does not meet the preset condition, adjusting an exposure parameter until luminance of a second image displayed by using the photographing interface meets the preset condition, and determining, as the target exposure parameter, an exposure parameter used to generate the second image. The second image is another preview image captured for the first scene. The exposure parameter used to generate the first image is different from the exposure parameter used to generate the second image.

The foregoing preset condition is that a difference between target luminance and current luminance is less than or equal to a first preset threshold and the target luminance is greater than or equal to the current luminance. The target luminance is actual luminance of the first scene, and the current luminance is luminance of a currently captured preview image.

It should be understood that the foregoing preset condition may be represented by using the following formula:

$$(|target-cur|\leq tolerance) \text{ and } (target\geq cur), \text{ where}$$

target represents the target luminance, cur represents the current luminance, and tolerance is the first preset threshold.

It should be understood that each preview image displayed in the photographing interface of the electronic device is an image captured for the first scene based on the exposure parameter, that is, each preview image has a group of corresponding exposure parameters. The exposure parameter is determined based on an AE module of the electronic device.

For example, the AE module of the electronic device corresponds to a preset exposure meter, each index in the exposure meter corresponds to an exposure combination (namely, the foregoing exposure parameter), and each exposure combination includes an exposure volume and an exposure time. When performing photographing in an AE manner, the electronic device may obtain a target luminance value of a to-be-photographed picture through statistics collection, select an index in the exposure meter based on the target luminance value, and then change a current luminance value of the to-be-photographed picture by using an exposure combination corresponding to the index. For example, if an index corresponding to the current luminance value of the to-be-photographed picture (namely, the preview image captured for the first scene) is i, and an index corresponding to the target luminance value is j, the electronic device first changes the current luminance value of the to-be-photographed picture by using an exposure combination corresponding to an index k between the index i and the index j, then selects an exposure combination corresponding to an index between the index k and the index j to continue to change the current luminance value of the to-be-photographed picture, and so on, until the electronic device finally use an exposure combination corresponding to the index j to change the current luminance value of the to-be-photographed picture to the target luminance value. It should be understood that, for the exposure combination corresponding to the finally used index, current luminance of a captured to-be-photographed picture may be converged to the foregoing preset condition.

It should be understood that the foregoing process of adjusting the exposure parameter is the foregoing process of selecting an index.

It should be further understood that the foregoing first preset threshold may be preset by a developer on the electronic device. For example, the first preset threshold is 1, 2, or another value. This is not limited in this application.

In this embodiment of this application, that the first scene is different from the scene in previous photographing means that the scene in current photographing is a new scene. In this case, it may be further determined whether the preview image corresponding to the first scene meets the preset condition. When the preset condition is met, the exposure parameter may not be adjusted, and the exposure parameter used to generate the current preview image is used as the target exposure parameter used to photograph the first scene. According to this method for determining the target exposure parameter, it may be ensured that preview images obtained for a same scene a plurality of times are consistent.

In an optional embodiment, the determining, in response to a photographing operation of a user, whether the first scene is the same as a scene in previous photographing includes: setting a value of a preset flag bit to a first value in response to the photographing operation of the user, where the first value is used to indicate the electronic device to perform photographing; and determining whether the first scene is the same as the scene in previous photographing.

For example, the foregoing preset flag bit may be cap_flag, and the value of the preset flag bit is set to the first value, that is, cap_flag==1, to indicate that the electronic device performs photographing. In other words, when cap_flag==1, it is determined that the first scene is the same as the scene in previous photographing, and the exposure parameter used for previous photographing may be still used.

In an optional embodiment, the determining, when the first scene is different from the scene in previous photographing, whether luminance of the first image meets a preset condition includes: setting the value of the preset flag bit to a second value when the first scene is different from the scene in previous photographing; and determining, based on the second value, whether the luminance of the first image meets the preset condition.

Based on the foregoing example of the flag bit, the value of the preset flag bit is set to the second value, that is, cap_flag==0. The electronic device enters a preview mode, that is, the exposure parameter is continuously adjusted, so that the foregoing preset condition is met.

In an optional embodiment, the determining whether the first scene is the same as a scene in previous photographing includes: calculating a similarity between the first image and a third image captured during the previous photographing; and when the similarity is less than or equal to a second preset threshold, determining that the first scene is the same as the scene in previous photographing.

It should be understood that the foregoing third image may be an image obtained by the electronic device by using a sensor during the previous photographing.

It should be further understood that the foregoing second preset threshold may be preset by the developer on the electronic device.

The similarity in this embodiment of this application may also be referred to as a correlation coefficient or another name, and is used to indicate whether two images are the same or similar.

In an optional embodiment, the calculating a similarity between the first image and a third image obtained during the previous photographing includes: obtaining a first histogram corresponding to the first image, where the first histogram represents an association relationship between a quantity of pixels of the first image and a gray level; obtaining a second histogram corresponding to the third image, where the second histogram represents an association relationship between a quantity of pixels in the third image and a gray level; and calculating a similarity diff between the first histogram and the second histogram by using the following formula:

$$diff=\sum_{k=0}^{n}\frac{(H1(k)-H2(k))^2}{H1(k)+H2(k)},$$

H1(k) is a quantity of pixels corresponding to a gray level kin the first histogram, H2(k) is a quantity of pixels corresponding to a gray level k in the second histogram, and n=255.

It should be understood that the foregoing histogram may reflect a relationship between an occurrence frequency of a pixel at each gray level (gray level) in an image and the gray level. Generally, the gray level (ray level) is used as a horizontal coordinate, and a quantity of pixels is used as a vertical coordinate. For example, the electronic device may collect statistics about a quantity of times of occurrence of each pixel in an image.

In this embodiment of this application, the similarity between the images is calculated to further determine whether the scenes in the two times of photographing are the same. Therefore, when it is determined that the scenes in the two times of photographing are the same, the exposure parameter used for previous photographing may be used for current photographing, thereby ensuring photographing consistency of a same scene, and improving photographing experience of the user.

In an optional embodiment, it is determined, in response to the photographing operation of the user, whether a dynamic range DR parameter of a first preview image reaches a preset threshold, where the first preview image is a preview image displayed in the photographing interface when the electronic device receives the photographing operation of the user; when the DR parameter reaches the preset threshold, a photographed raw image is separately processed in a first processing manner and a second processing manner, to separately obtain a fourth image and a fifth image, where YUV of the fourth image is different from YUV of the fifth image, and the first preview image and the raw image are images captured for a same scene; fusion processing is performed on the fourth image and the fifth image to obtain a target image; and the target image is displayed. The target image is an image displayed by the electronic device in response to the operation of the user. The raw image may be an image that is of a to-be-photographed scene and that is captured by the sensor of the electronic device.

It should be understood that the foregoing DR parameter is updated in real time, that is, the DR parameter corresponds to an image displayed in a current photographing interface of the electronic device. For calculation of the DR parameter, refer to calculation of the DR parameter in the conventional technology. Details are not described herein again. The foregoing DR parameter that reaches the preset threshold may be a DR parameter corresponding to the preview image displayed in the photographing interface when the electronic device receives the photographing operation of the user.

It should be understood that the foregoing preset threshold may be preset by the developer on the electronic device, and the preset threshold is used to determine a specific manner of processing the obtained raw image. For example, when the DR parameter is less than the preset threshold, the raw image may be processed in the first processing manner; or when the DR parameter is greater than the preset threshold, the raw image may be processed in the second processing manner.

It should be further understood that the foregoing YUV is a color coding method. "Y" represents luminance (luminance or luma), for example, a gray level value. "U" and "V" represent chrominance (chrominance or chroma), and are used to describe a color and saturation of an image and specify a color of a pixel.

Currently, when the electronic device enters different photographing modes, there may be a large difference between photographing results obtained by photographing a same scene. A reason is that different photographing modes correspond to different processing manners. A specific processing manner in which the electronic device determines to perform image processing mainly depends on the DR parameter of the image. For example, when the DR parameter is less than the preset threshold, processing is performed in the first processing manner; or when the DR parameter is greater than the preset threshold, processing is performed in the second processing manner. However, because the DR parameter is in a dynamic change range, and in some critical scenarios (that is, the DR parameter is equal to the preset threshold or near the preset threshold), different times of photographing on a same scene may be determined as different photographing modes, and there is a large difference between finally obtained results of a plurality of times of photographing. Based on this, in this embodiment of this application, when a same scene is photographed, first processing and second processing are separately performed on the image whose DR parameter reaches the preset threshold, to obtain the fourth image and the fifth image, so that fusion processing is performed on the fourth image and the fifth image, and an image obtained after fusion processing is used as a photographing result (target image) of current photographing. Even in some critical scenarios, a case in which photographing results are not consistent because different processing modes are entered in different times of photographing is avoided, thereby improving photographing experience of the user.

In an optional embodiment, the foregoing first processing manner and the foregoing second processing manner are used to perform tone mapping on the raw image, but the second processing manner includes post-processing, and the first processing manner does not include post-processing.

It should be understood that, in addition to the foregoing tone mapping, the foregoing first processing manner and the foregoing second processing manner each may further include another processing manner.

For example, the foregoing first processing manner is as follows: The electronic device inputs, into the TSP module for processing, the raw image obtained by using the sensor, to obtain a YUV image, namely, the foregoing fourth image. The foregoing second processing manner is as follows: The electronic device performs post-processing on the raw image obtained by using the sensor, and inputs the raw image into the ISP for processing, to obtain a YUV image, namely, the foregoing fifth image. For example, the foregoing processing procedure of the ISP may successively include: performing black level compensation, lens shading correction (lens shading correction), bad pixel correction, color interpolation, noise reduction, white balance correction, color correction, gamma (gamma) correction, color space conversion (RGB is converted to YUV), chroma noise reduction and edge enhancement in YUV color space, and color and contrast enhancement on the raw image; performing automatic exposure control and the like; and finally outputting data in a YUV format. It should be understood that post-processing may be an image processing algorithm in the ISP In an optional embodiment, the performing fusion processing on the fourth image and the fifth image based on the DR parameter to obtain a target image includes: weighting a pixel value of the fourth image and a pixel value of the fifth image by using the DR parameter as a weight of the fourth image and a difference between 1 and the DR parameter as a weight of the fifth image, to obtain the target image.

For example, the foregoing fusion processing may be performed in the following manner:

target image=DR parameter×pixel value of the first image+(1−DR parameter)×pixel value of the second image.

It should be understood that the DR parameter in this embodiment of this application is a number greater than 0 and less than 1.

Figure 3:
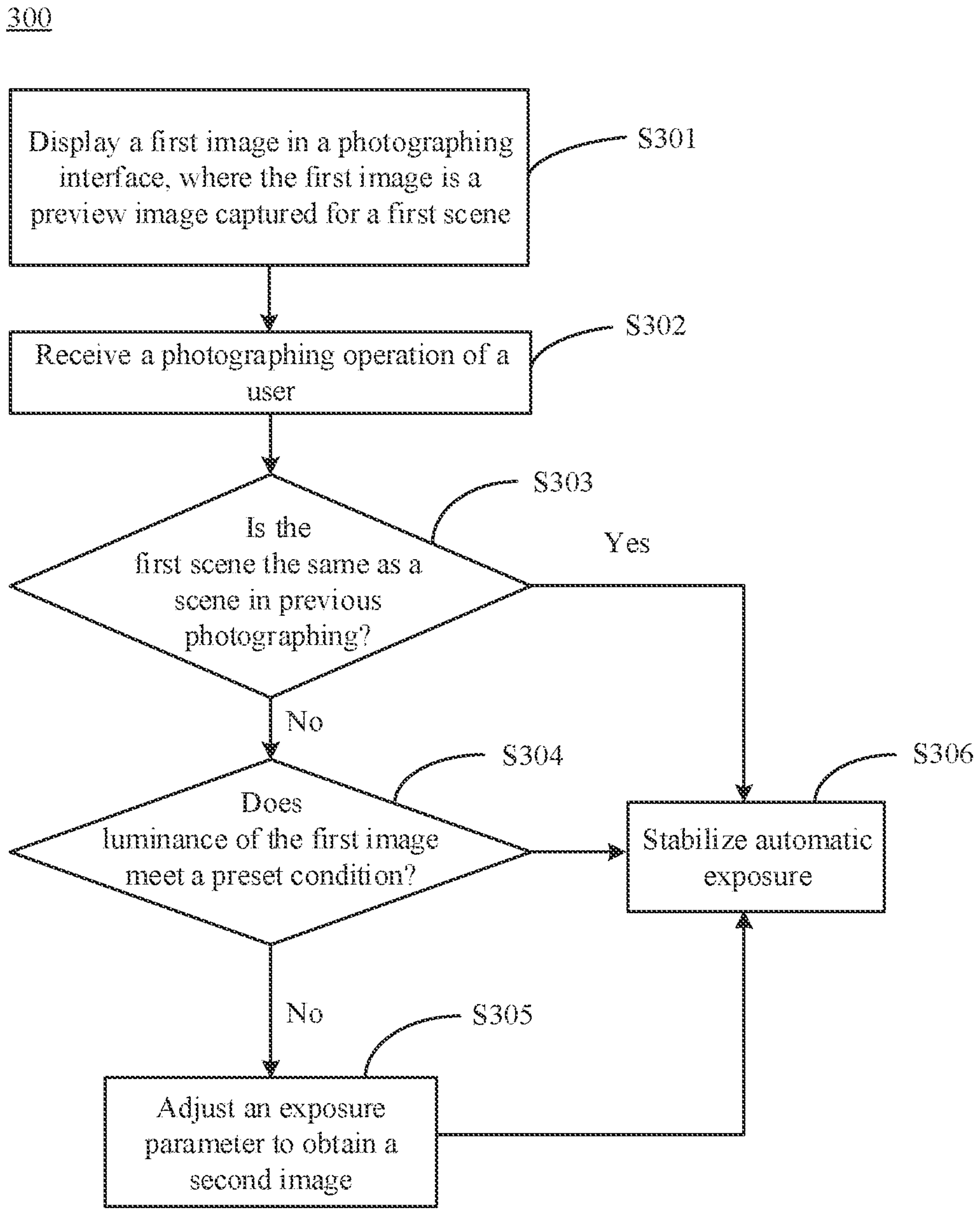
FIG. 3 is a schematic flowchart of another photographing method according to an embodiment of this application.

FIG. 3 is a schematic flowchart of another photographing method 300 according to an embodiment of this application. As shown in FIG. 3, the method 300 includes:

S301. Display a first image in a photographing interface of an electronic device, where the first image is a preview image captured for a first scene. For description of the first scene, refer to the method 200. Details are not described herein again.

S302. The electronic device receives a photographing operation of a user.

S303. The electronic device determines whether the first scene is the same as a scene in previous photographing. A specific determining manner may be performing determining based on an image similarity between the two scenes, that is, when the similarity is less than or equal to a preset threshold, it is determined that the scenes in the two times of photographing are the same; or when the similarity is greater than a preset threshold, it is determined that the scenes in the two times of photographing are different. For a calculation manner of the similarity, refer to the foregoing related description. Details are not described herein again.

When the first scene is the same as the scene in previous photographing, S306 is performed to stabilize automatic exposure, that is, an exposure parameter used for previous photographing may be determined as a target exposure parameter, and no further adjustment is performed.

When the first scene is different from the scene in previous photographing, S304 is performed to determine whether luminance of the first image meets a preset condition.

It should be understood that, for related descriptions of the preset condition, refer to descriptions of the preset condition in the foregoing embodiment. Details are not described herein again.

When the luminance of the first image meets the preset condition, S306 is performed to stabilize automatic exposure, that is, an exposure parameter used to generate the first image may be determined as a target exposure parameter, and no further adjustment is performed.

When the luminance of the first image does not meets the preset condition, S305 is performed to adjust an exposure parameter to obtain a second image. Luminance of the second image meets the foregoing preset condition.

It should be noted that, when the electronic device performs S302 and S303, a value of a preset flag bit is set to a first value, that is, the electronic device enters a photographing mode. When the electronic device performs S304 and S305, a value of a preset flag bit is set to a second value, that is, the electronic device enters a preview mode.

Figure 4:
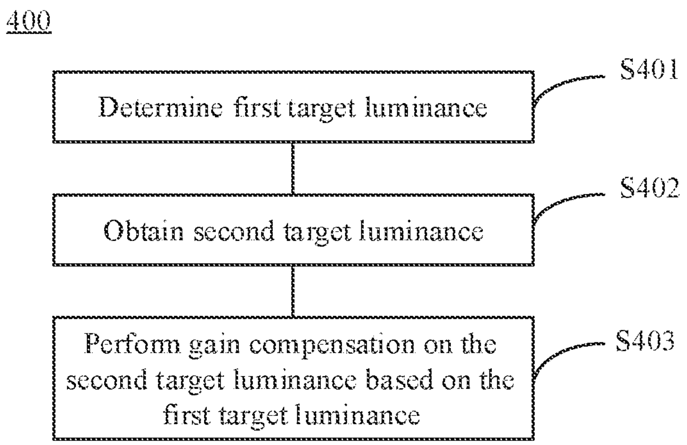
FIG. 4 is a schematic flowchart of still another photographing method according to an embodiment of this application.

FIG. 4 is a schematic flowchart of still another photographing method 400 according to an embodiment of this application. As shown in FIG. 4, the method 400 may include the following steps:

S401. Determine first target luminance. The first target luminance is scene luminance (LV), and the scene luminance is a middle gray luminance of an image obtained after ISP processing.

It should be understood that the first target luminance is related to a to-be-photographed scene, that is, when the scene remains unchanged or changes little, it may be considered that the luminance is stable.

S402. Obtain second target luminance. The second target luminance is target luminance obtained by an electronic device by using an AE module, and may be referred to as AE target luminance.

It should be understood that, for the foregoing process of obtaining the second target luminance, refer to related descriptions about obtaining the AE target luminance in a working procedure of the AE module in the conventional technology. Details are not described herein again. For example, to suppress an overexposed area in a current to-be-photographed scene, the electronic device reduces the target luminance by using the AE module. In this case, AE is sensitive to a change of a highlight area. As a result, the AE target luminance (second target luminance) is not stable. Even in a same scene, the AE target luminance may change.

S403. Perform gain compensation on the second target luminance based on the first target luminance.

Based on the foregoing example in which AE adjusts the exposure area, when the AE module suppresses the overexposed area in the current to-be-photographed scene, an area with normal luminance in the to-be-photographed scene is underexposed. However, in actual application, a user hopes that the area with normal luminance does not change when the overexposed area is adjusted. Based on this, in this application, gain compensation may be performed on the second target luminance based on the first target luminance to compensate for the underexposed area, so that finally obtained image luminance is normal, thereby improving photographing experience of the user.

For example, the foregoing gain compensation coefficient Dgain may be calculated by using the following formula:

*D*gain=first target luminance/second target luminance.

The foregoing describes the photographing method in the embodiments of this application in detail with reference to FIG. 2 to FIG. 4. The following describes a photographing apparatus in the embodiments of this application in detail with reference to FIG. 5.

Figure 5:
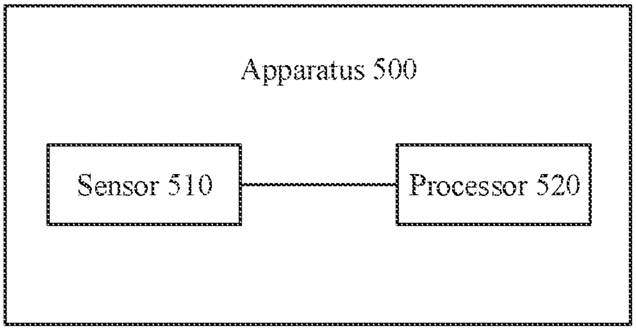
FIG. 5 is a schematic block diagram of a photographing apparatus according to an embodiment of this application.

FIG. 5 is a schematic block diagram of a photographing apparatus 500 according to an embodiment of this application. As shown in FIG. 5, the apparatus includes a sensor 510 and a processor 520. The sensor 510 is configured to obtain an image of a to-be-photographed scene. The processor 520 is configured to process the image obtained by the sensor. The apparatus 500 may be configured to implement the method in any of the foregoing method embodiments.

For example, the photographing apparatus 500 shown in FIG. 5 may be applied to an electronic device. The electronic device may obtain a first image of a first scene by using the sensor 510, and display the first image by using a display screen of the electronic device. When receiving photographing operation of a user, the electronic device determines, by using the processor 520, whether the first scene is the same as a scene in previous photographing; and when the first scene is the same as the scene in previous photographing, determines, as a target exposure parameter, an exposure parameter used for previous photographing.

It should be understood that the apparatus 500 shown in FIG. 5 may be integrated into the electronic device 100 shown in FIG. 1. When the photographing apparatus 500 is integrated into the electronic device 100, the processor 100 in FIG. 1 may be configured to implement a function of the processor 510 in the apparatus 500, for example, image processing. Alternatively, the processor 510 in the apparatus 500 may be deployed separately. This is not limited in this application.

This application further provides a computer-readable storage medium. The computer-readable storage medium is configured to store a computer program, and the computer program is used to implement the method described in the foregoing method embodiments.

This application further provides a computer program product. The computer program product includes a computer program (which may also be referred to as code or an instruction), and when the computer program is run on a computer, the computer can perform the method described in the foregoing method embodiments.

A person of ordinary skill in the art may be aware that the units and the algorithm steps in the examples described with reference to the embodiments disclosed in this specification can be implemented by using electronic hardware or a combination of computer software and electronic hardware. Whether these functions are implemented in a hardware or software manner depends on specific applications and design constraints of the technical solutions. A person skilled in the art may use different methods to implement the described functions for each specific application, but it should not be considered that such an implementation goes beyond the scope of this application.

It may be clearly understood by a person skilled in the art that for convenience and brevity of description, for specific working processes of the described system, apparatus, and unit, refer to the corresponding processes in the foregoing method embodiments. Details are not described herein again.

In several embodiments provided in this application, it should be understood that the disclosed system, apparatus, and method may be implemented in another manner. For example, the apparatus embodiments described above are merely examples. For example, the unit division is merely logical function division, and there may be another division manner in actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or communication connections between the apparatuses or units may be implemented in electrical, mechanical, or another form.

The units described as separate components may or may not be physically separated, and components displayed as units may or may not be physical units, that is, may be located in one place, or may be distributed on a plurality of network units. Some or all of the units may be selected based on actual requirements to achieve the objectives of the solutions of embodiments.

In addition, the functional units in embodiments of this application may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions of this application essentially, or the part contributing to the conventional technology, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A photographing method, applied to an electronic device, wherein the method comprises:

displaying a first image in a photographing interface, wherein the first image is a preview image captured for a first scene;

determining, in response to a photographing operation of a user, whether the first scene is the same as a scene in previous photographing;

when the first scene is the same as the scene in previous photographing, determining, as a target exposure parameter, an exposure parameter used for previous photographing; and photographing the first scene based on the target exposure parameter, and wherein the method further comprises:

determining, when the first scene is different from the scene in previous photographing whether luminance of the first image meets a preset condition; and when the luminance of the first image meets the preset condition, determining, as the target exposure parameter, an exposure parameter used to generate the first image; or when the luminance of the first image does not meet the preset condition, adjusting an exposure parameter until luminance of a second image displayed by using the photographing interface meets the preset condition, and determining, as the target exposure parameter, an exposure parameter used to generate the second image, wherein the second image is another preview image captured for the first scene, the exposure parameter used to generate the first image is different from the exposure parameter used to generate the second image, the preset condition is that a difference between target luminance and current luminance is less than or equal to a first preset threshold and the target luminance is greater than or equal to the current luminance, the target luminance is actual luminance of the first scene, and the current luminance is luminance of a currently captured preview image.

2. The method according to claim 1, wherein the determining, in response to a photographing operation of a user, whether the first scene is the same as a scene in previous photographing comprises:

setting a value of a preset flag bit to a first value in response to the photographing operation of the user, wherein the first value is used to indicate the electronic device to perform photographing; and determining, based on the first value, whether the first scene is the same as the scene in previous photographing.

3. The method according to claim 2, wherein the determining, when the first scene is different from the scene in previous photographing, whether luminance of the first image meets a preset condition comprises:

setting the value of the preset flag bit to a second value when the first scene is different from the scene in previous photographing; and determining, based on the second value, whether the luminance of the first image meets the preset condition.

4. The method according to claim 1, wherein the determining whether the first scene is the same as a scene in previous photographing comprises:

calculating a similarity between the first image and a third image captured during the previous photographing; and when the similarity is less than or equal to a second preset threshold, determining that the first scene is the same as the scene in previous photographing.

5. The method according to claim 4, wherein the calculating a similarity between the first image and a third image captured during the previous photographing comprises:

obtaining a first histogram corresponding to the first image, wherein the first histogram represents an association relationship between a quantity of pixels of the first image and a gray level;

obtaining a second histogram corresponding to the third image, wherein the second histogram represents an association relationship between a quantity of pixels in the third image and a gray level; and calculating a similarity diff between the first histogram and the second histogram by using the following formula:

$$diff = \sum_{k=0}^{n} \frac{(H1(k) - H2(k))^2}{H1(k) + H2(k)},$$

wherein

H1 is a quantity of pixels corresponding to a gray level k in the first histogram, H2 is a quantity of pixels corresponding to a gray level k in the second histogram, and n=255.

6. The method according to claim 1, wherein the method further comprises:

determining, in response to the photographing operation of the user, whether a dynamic range DR parameter of a first preview image reaches a preset threshold, wherein the first preview image is a preview image displayed in the photographing interface when the electronic device receives the photographing operation of the user, when the DR parameter reaches the preset threshold, separately processing a photographed raw image in a first processing manner and a second processing manner, to separately obtain a fourth image and a fifth image, wherein YUV of the fourth image is different from YUV of the fifth image, and the first preview image and the raw image are images captured for a same scene;

performing fusion processing on the fourth image and the fifth image to obtain a target image; and displaying the target image.

7. The method according to claim 6, wherein the first processing manner and the second processing manner are used to perform tone mapping on the raw image, and the second processing manner comprises post-processing, but the first processing manner does not comprise post-processing.

8. The method according to claim 6, wherein the performing fusion processing on the fourth image and the fifth image based on the DR parameter to obtain a target image comprises:

weighting a pixel value of the fourth image and a pixel value of the fifth image by using the DR parameter as a weight of the fourth image and a difference between 1 and the DR parameter as a weight of the fifth image, to obtain the target image.

9. An electronic device, comprising at least one processor; and one or more non-transitory computer-readable storage media coupled to the at least one processor and storing programming instructions for execution by the at least one processor, wherein the programming instructions, when executed, cause the electronic device to perform operations comprising:

displaying a first image in a photographing interface, wherein the first image is a preview image captured for a first scene;

determining, in response to a photographing operation of a user, whether the first scene is the same as a scene in previous photographing;

when the first scene is the same as the scene in previous photographing, determining as a target exposure parameter, an exposure parameter used for previous photographing; and photographing the first scene based on the target exposure parameter, and wherein the operations comprise:

determining, when the first scene is different from the scene in previous photographing, whether luminance of the first image meets a preset condition; and when the luminance of the first image meets the preset condition, determining, as the target exposure parameter, an exposure parameter used to generate the first image; or when the luminance of the first image does not meet the preset condition, adjusting an exposure parameter until luminance of a second image displayed by using the photographing interface meets the preset condition, and determining, as the target exposure parameter, an exposure parameter used to generate the second image, wherein the second image is another preview image captured for the first scene, the exposure parameter used to generate the first image is different from the exposure parameter used to generate the second image, the preset condition is that a difference between target luminance and current luminance is less than or equal to a first preset threshold and the target luminance is greater than or equal to the current luminance, the target luminance is actual luminance of the first scene, and the current luminance is luminance of a currently captured preview image.

10. The electronic device according to claim 9, wherein the determining, in response to a photographing operation of a user, whether the first scene is the same as a scene in previous photographing comprises:

setting a value of a preset flag bit to a first value in response to the photographing operation of the user, wherein the first value is used to indicate the electronic device to perform photographing; and determining, based on the first value, whether the first scene is the same as the scene in previous photographing.

11. The electronic device according to claim 10, wherein the determining, when the first scene is different from the scene in previous photographing, whether luminance of the first image meets a preset condition comprises:

setting the value of the preset flag bit to a second value when the first scene is different from the scene in previous photographing; and determining, based on the second value, whether the luminance of the first image meets the preset condition.

12. The electronic device according to claim 9, wherein the determining whether the first scene is the same as a scene in previous photographing comprises:

calculating a similarity between the first image and a third image captured during the previous photographing; and when the similarity is less than or equal to a second preset threshold, determining that the first scene is the same as the scene in previous photographing.

13. The electronic device according to claim 12, wherein the calculating a similarity between the first image and a third image captured during the previous photographing comprises:

obtaining a first histogram corresponding to the first image, wherein the first histogram represents an association relationship between a quantity of pixels of the first image and a gray level;

obtaining a second histogram corresponding to the third image, wherein the second histogram represents an association relationship between a quantity of pixels in the third image and a gray level; and calculating a similarity diff between the first histogram and the second histogram by using the following formula:

$$diff = \sum_{k=0}^{n} \frac{(H1(k) - H2(k))^2}{H1(k) + H2(k)},$$

wherein

H1 is a quantity of pixels corresponding to a gray level k in the first histogram, H2 is a quantity of pixels corresponding to a gray level k in the second histogram, and n=255.

14. The electronic device according to claim 9, wherein the operations comprise:

determining, in response to the photographing operation of the user, whether a dynamic range DR parameter of a first preview image reaches a preset threshold, wherein the first preview image is a preview image displayed in the photographing interface when the electronic device receives the photographing operation of the user;

when the DR parameter reaches the preset threshold, separately processing a photographed raw image in a first processing manner and a second processing manner, to separately obtain a fourth image and a fifth image, wherein YUV of the fourth image is different from YUV of the fifth image, and the first preview image and the raw image are images captured for a same scene;

performing fusion processing on the fourth image and the fifth image to obtain a target image; and displaying the target image.

15. A non-transitory computer-readable storage medium, configured to store a computer program, wherein the computer program comprises instructions that when executed by one or more processors, cause a computer to perform operations comprising:

displaying a first image in a photographing interface, wherein the first image is a preview image captured for a first scene;

determining, in response to a photographing operation of a user, whether the first scene is the same as a scene in previous photographing;

when the first scene is the same as the scene in previous photographing, determining, as a target exposure parameter, an exposure parameter used for previous photographing; and photographing the first scene based on the target exposure parameter, and wherein the operations comprise:

determining, when the first scene is different from the scene in previous photographing, whether luminance of the first image meets a preset condition; and when the luminance of the first image meets the preset condition, determining, as the target exposure parameter, an exposure parameter used to generate the first image; or when the luminance of the first image does not meet the preset condition, adjusting an exposure parameter until luminance of a second image displayed by using the photographing interface meets the preset condition, and determining, as the target exposure parameter, an exposure parameter used to generate the second image, wherein the second image is another preview image captured for the first scene, the exposure parameter used to generate the first image is different from the exposure parameter used to generate the second image, the preset condition is that a difference between target luminance and current luminance is less than or equal to a first preset threshold and the target luminance is greater than or equal to the current luminance, the target luminance is actual luminance of the first scene, and the current luminance is luminance of a currently captured preview image.

16. The non-transitory computer-readable storage medium according to claim 15, wherein the determining, in response to a photographing operation of a user, whether the first scene is the same as a scene in previous photographing comprises:

setting a value of a preset flag bit to a first value in response to the photographing operation of the user, wherein the first value is used to indicate to perform photographing; and determining, based on the first value, whether the first scene is the same as the scene in previous photographing.

17. The non-transitory computer-readable storage medium according to claim 16, wherein the determining, when the first scene is different from the scene in previous photographing, whether luminance of the first image meets a preset condition comprises:

setting the value of the preset flag bit to a second value when the first scene is different from the scene in previous photographing; and determining, based on the second value, whether the luminance of the first image meets the preset condition.

18. The non-transitory computer-readable storage medium according to claim 15, wherein the determining whether the first scene is the same as a scene in previous photographing comprises:

calculating a similarity between the first image and a third image captured during the previous photographing; and when the similarity is less than or equal to a second preset threshold, determining that the first scene is the same as the scene in previous photographing.

19. The non-transitory computer-readable storage medium according to claim 18, wherein the calculating a similarity between the first image and a third image captured during the previous photographing comprises:

obtaining a first histogram corresponding to the first image, wherein the first histogram represents an association relationship between a quantity of pixels of the first image and a gray level;

obtaining a second histogram corresponding to the third image, wherein the second histogram represents an association relationship between a quantity of pixels in the third image and a gray level; and calculating a similarity diff between the first histogram and the second histogram by using the following formula:

$$diff = \sum_{k=0}^{n} \frac{(H1(k) - H2(k))^2}{H1(k) + H2(k)},$$

wherein

H1 is a quantity of pixels corresponding to a gray level k in the first histogram, H2 is a quantity of pixels corresponding to a gray level k in the second histogram, and n=255.

* * * * *